United States Patent
Bennett et al.

(10) Patent No.: US 7,551,656 B2
(45) Date of Patent: Jun. 23, 2009

(54) LOW STRESS OPTICS MOUNT USING THERMALLY CONDUCTIVE LIQUID METAL OR GEL

(75) Inventors: Glenn Bennett, Boulder, CO (US); Michael Robert Browning, Littleton, CO (US); Mark Jon Kukla, Brookline, NH (US); Steven Craig Palomino, Longmont, CO (US); Lawrence Francis Rubin, Lafayette, CO (US); Dane Lewis Schnal, Boulder, CO (US)

(73) Assignee: Lockheed Martin Coherent Technologies, Inc., Louisville, CO (US)

( * ) Notice: Subject to any disclaimer, the term of this patent is extended or adjusted under 35 U.S.C. 154(b) by 222 days.

(21) Appl. No.: 11/392,151

(22) Filed: Mar. 29, 2006

(65) Prior Publication Data
US 2007/0238219 A1  Oct. 11, 2007

(51) Int. Cl.
*H01S 3/04* (2006.01)
(52) U.S. Cl. .............................. 372/34; 372/35; 372/36
(58) Field of Classification Search ................... 372/34, 372/35, 36
See application file for complete search history.

(56) References Cited

U.S. PATENT DOCUMENTS

| | | |
|---|---|---|
| 4,378,601 A | 3/1983 | Eggleston et al. |
| 4,468,774 A | 8/1984 | Robbins |
| 4,563,763 A | 1/1986 | Kuhn |
| 4,594,716 A | 6/1986 | Guch |
| 4,601,038 A | 7/1986 | Guch |
| 4,881,233 A | 11/1989 | von Arb et al. |
| 4,949,346 A | 8/1990 | Kuper et al. |
| 5,272,710 A | 12/1993 | Sumida et al. |
| 5,331,652 A | 7/1994 | Rapoport et al. |
| 5,561,590 A | 10/1996 | Norell et al. |
| 5,572,404 A | 11/1996 | Layton et al. |
| 5,658,831 A | 8/1997 | Layton et al. |
| 6,014,391 A | 1/2000 | Byren |
| 6,281,573 B1 | 8/2001 | Atwood et al. |
| 6,656,770 B2 | 12/2003 | Atwood et al. |
| 6,665,186 B1 | 12/2003 | Calmidi et al. |
| 6,748,350 B2 | 6/2004 | Rumer et al. |
| 2003/0026534 A1* | 2/2003 | Skull et al. ................... 385/27 |
| 2006/0245458 A1* | 11/2006 | Rapoport et al. ............. 372/36 |
| 2007/0248137 A1* | 10/2007 | Basu ........................... 372/67 |
| 2008/0069160 A1* | 3/2008 | Stephens ...................... 372/35 |

* cited by examiner

*Primary Examiner*—Dung T Nguyen
(74) *Attorney, Agent, or Firm*—McDermott Will & Emery LLP

(57) ABSTRACT

An optical assembly with mounting provided to effectively transfer heat away from an optic, such as a slab or waveguide amplifier or laser disk, while limiting internal stresses. The assembly includes an optic with a planar surface. A heat sink is positioned in the assembly with an upper surface next to the planar surface of the optic. The upper surface of the heat sink comprises a recessed surface defining a reservoir for containing a compliant heat transfer material. The assembly may further include a volume of the heat transfer material, such as a liquid metal or thermally conductive gel, in the reservoir of the heat sink. In one embodiment, the optic is a slab amplifier with a reflective coating or layer that directly contacts the heat transfer material in the heat sink reservoir or a foil or membrane is provided between the heat transfer material and the slab.

22 Claims, 10 Drawing Sheets

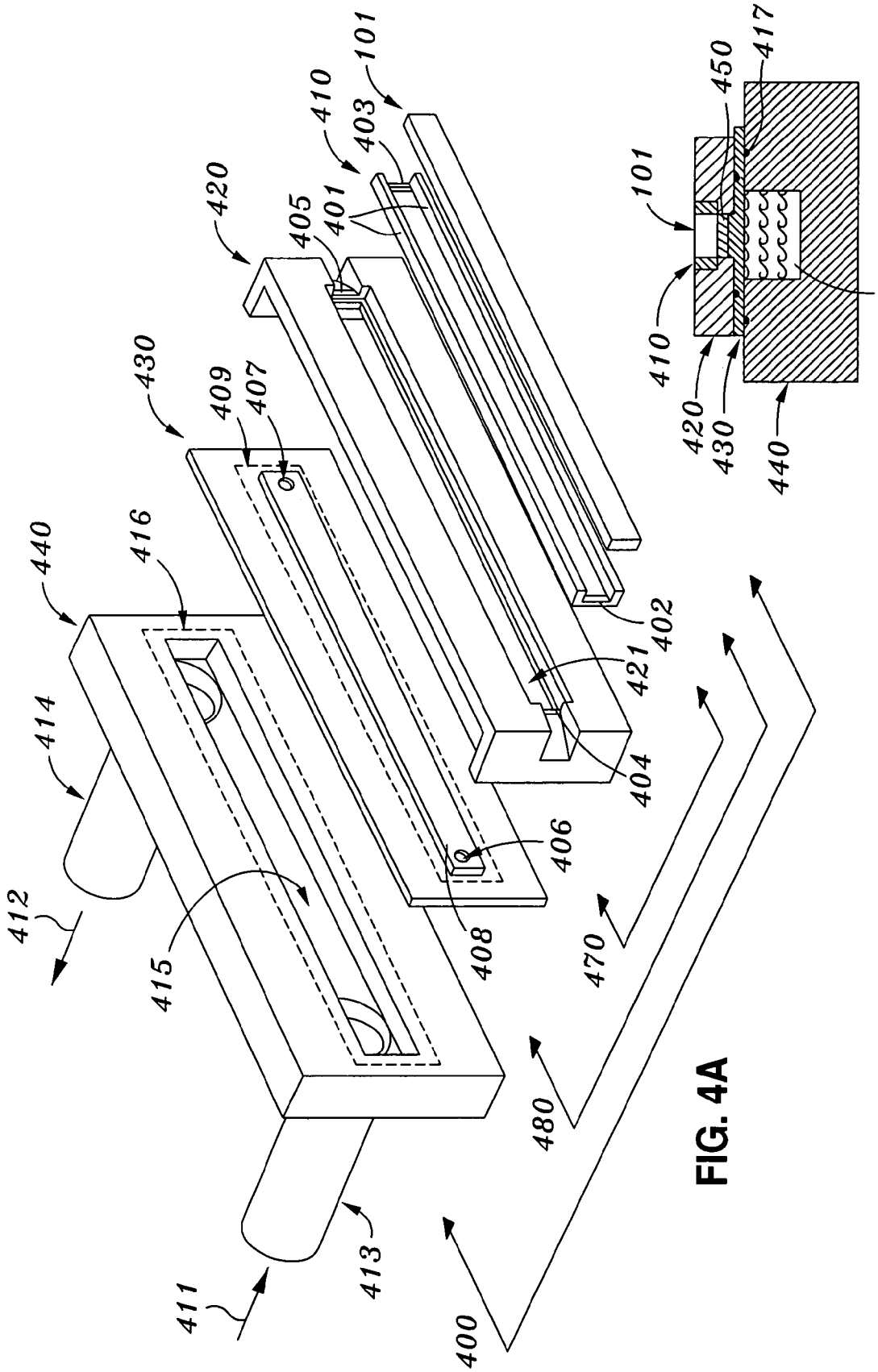

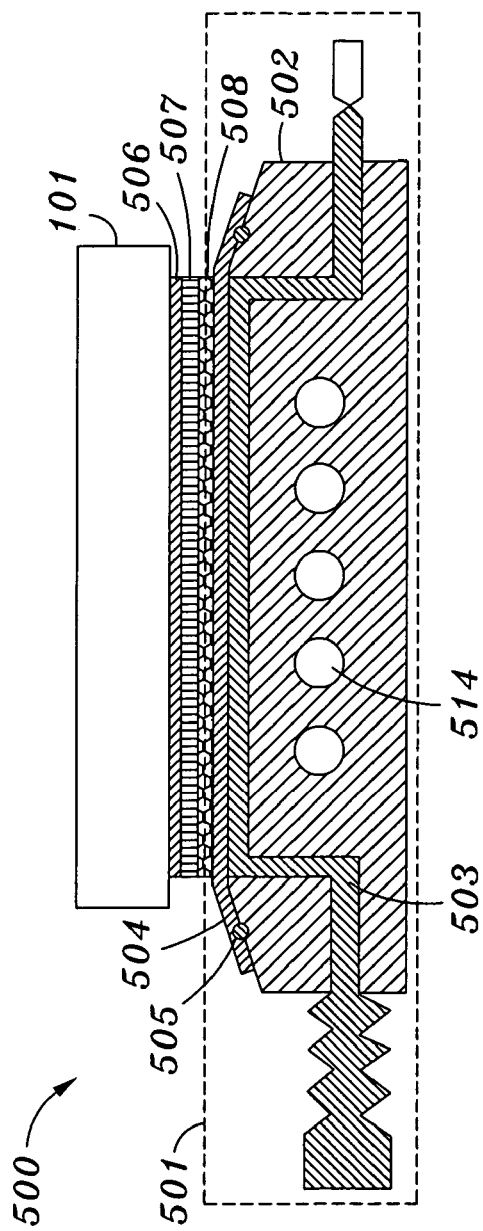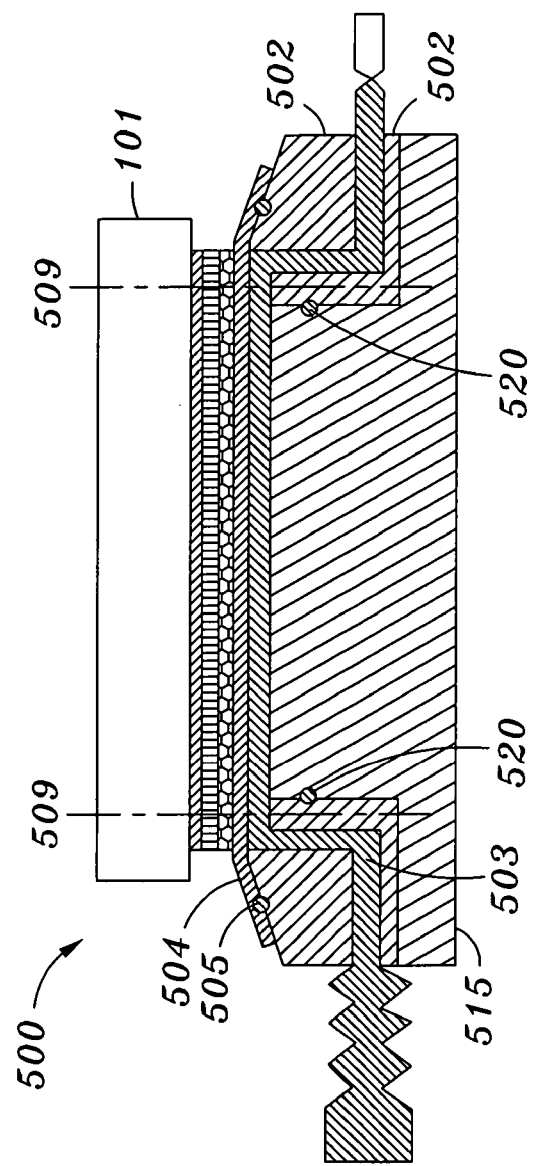
FIG. 5A
FIG. 5B

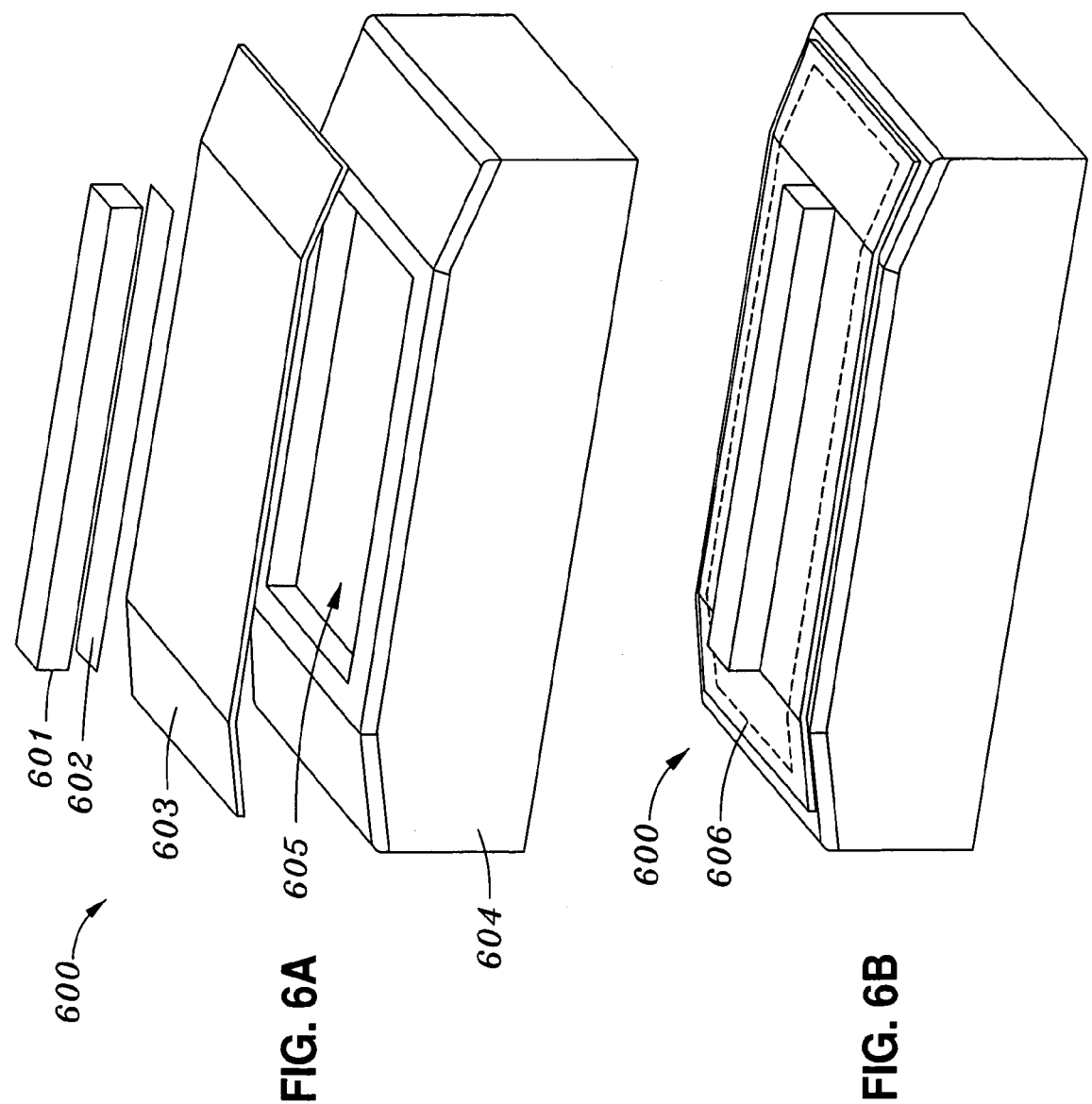

LOW STRESS OPTICS MOUNT USING THERMALLY CONDUCTIVE LIQUID METAL OR GEL

BACKGROUND OF THE INVENTION

1. Field of the Invention

This invention is generally related to mechanical mounts and methods of mechanical mounting, and in particular, to methods and apparatus for mounting optical components, such as lasers, in a manner that controls stress development and that also permits high heat flow from the components.

2. Relevant Background

High power lasers and laser amplifiers having very high beam quality are difficult to make because a number of factors degrade performance. One such factor is heat deposition within the laser material resulting from imperfect conversion of pump radiation power into laser output power. Most frequently it is not absolute temperature rise that is of concern but, instead, spatial gradients within the material. It is well known that parameters, such as the refractive index, are temperature dependent, and consequently temperature gradients lead to refractive index gradients, which in turn degrade the performance of the laser or amplifier. Heat loads and poor mechanical mounting techniques also cause stresses in the materials that degrade performance by introducing wavefront distortions.

In an attempt to address problems associated with stresses generated during mounting, considerable efforts have been expended within the laser industry in finding ways to mount laser rods and slabs that optimize optical performance. Compounding the problem is the fact that a relatively large amount of heat must be removed from the material during mounting, and as a result, implemented mounting techniques typically provide a good heat conduction path to a heat sink or cold plate where the heat is removed through convection, conduction, or radiation. A further complication is that laser radiation must be extracted from the rod or slab through apertures and at least some of the laser material must be exposed to permit pump light to enter the material for absorption.

A number of techniques have been conceived to mount round laser rods, and these techniques are aimed at permitting good heat flow and at addressing stress production. One technique is disclosed by Guch in U.S. Pat. Nos. 4,594,716 and 4,601,038. Another technique is described by Rapoport et al. in U.S. Pat. No. 5,331,652. A third technique that is more specifically aimed at mounting round laser rods for low stress is disclosed by Sumida in U.S. Pat. No. 5,272,710 and involves mounting the rod in a transparent sleeve with an elastomer providing a mechanically compliant conduction path between the rod and sleeve. Common to all these techniques is the assumption of round laser rods. Such circular geometries are attractive in part because of the ease of fabrication, but, unfortunately, these mounting techniques are not particularly well suited for slabs having a rectangular shape (or not being round in cross section).

Slab geometries are attractive for several reasons and are particularly useful in the generation of high optical output powers. First, they provide at least one rectangular flat surface through which pump light can enter. Second, with uniform pumping, slab geometries promote one-dimensional temperature gradients. Third, they provide a method to "zig-zag" a laser beam within the medium. The latter provides for a way to extract energy efficiently with good beam quality. In order to maximize the advantages inherent in such slab geometry, it is, however, important to design the mounting and cooling arrangements very carefully.

Some efforts have been made in the laser industry to address some of the challenges associated with mounting of slab geometries. For example, a number of issued patents describe methods of mounting slabs that incorporate a gas or liquid flow channel between the source of pump radiation and the slab, e.g., U.S. Pat. Nos. 4,378,601; 4,468,774; 4,881,233; and 4,563,763. These methods or approaches have several drawbacks and do not adequately meet the needs of the laser industry. First, these methods assume the presence of a flowing cooling liquid and, therefore, preclude operating with a passive heat disposing mechanism. Second, these methods are often susceptible to the depositing of unwanted contaminants on the surface of the slab that may degrade the performance of the laser.

A somewhat more attractive solution may involve an arrangement in which passive heat spreaders and radiators are used without flowing coolants, such as cooling gas or liquid, being provided as an intrinsic part of the construction. For example, U.S. Pat. No. 4,949,346 discloses a method to sandwich a slab between transparent conductive heat sinks which also act as guides to transport pump light to the slab. However, the described method fails to solve the problem of removing large amounts of heat from the assembly. Also, the method includes bonding the slab to the conductive heat sinks, which does not work well at high thermal loads since it promotes stresses within the laser slab. An alternative method applicable to end-pumped slabs is disclosed in U.S. Pat. No. 6,014,391. In this alternative method, curved surfaces are used to concentrate pump light, and absorbing materials are attached to the ends of the slab. However, this approach is very complex and requires fabrication of curved surfaces, which is more difficult and expensive than the fabrication of flat surfaces.

None of these methods effectively provides for heat conduction directly to a high thermal conductivity material. Generally, heat conduction takes place through an intermediate material, such as elastomers, glasses, or crystals. These materials have thermal conductivities that are generally 10 to 1000 times or more lower than metals and consequently provide a far higher thermal resistance than metals.

Some attempts have been made utilizing amalgams of mercury. Unfortunately, the use of toxic mercury carries with it potential health hazards, and additionally, these efforts have applied only to round geometries. More significantly, these efforts do not effectively reduce stresses on the laser material because the mounting techniques teach providing a fixed volume of amalgam, which typically will result in transferring stresses to the laser rod when parts of the assembly undergoes thermal expansion as is explained below with reference to FIGS. 1A to 1D.

Of course, removing heat from confined spaces is a problem faced in industries other than the optics or laser industry. For example, removing heat is often a concern in the operation of integrated circuits. Numerous methods have been devised to conduct heat from integrated circuits, and several of these methods involve the use of liquid metals. Such heat removal methods are disclosed, for example, in U.S. Pat. Nos. 6,665,186; 6,748,350; 6,281,573; 6,656,770; 5,658,831; 5,572,404; and 5,561,590. The general purpose of these heat removal techniques differs in fundamental ways from the purpose in optics in that the desire is to permit the conducting medium to expand and contract rather than the heat source. The integrated circuit chip itself (i.e., the heat generator) is typically rigidly bonded on one side to a mount, and the compliant conducting material fills the space between the other side of the chip and a heat sink. As a result of such construction, the conducting material may deform as a result of relative motion between the chip and heat sink generating stresses internal to the chip. For at least this reason, bonding techniques used for integrated circuits do not address the needs for "stress-free" mounting of optics such as lasers.

SUMMARY OF THE INVENTION

The present invention addresses the problems discussed above by providing a method for mounting slabs in a substantially stress-free state while also permitting pump light to enter the slab without passing through a liquid flow and also not assuming the presence of a flowing gas or liquid for cooling. Furthermore, the thermal resistance is very low in assemblies created by mounting techniques of the invention as a conduction path between slab and heat removal is in many embodiments constructed entirely from high thermal conductivity materials. Furthermore reservoirs with variable volume may be created, which enable stresses on the laser slab to be minimized as the slab expands and contracts during heat loading.

According to one aspect of the invention, a semi-rigid slab mount is provided that holds a slab firmly in place while also permitting the slab to expand and contract under a heat load. This may be accomplished by contacting the slab with a layer of a high thermal conductivity medium, preferably a liquid metal or a thermally conductive gel or slurry confined to a hollowed-out space in a heat sink. To prevent leakage of the liquid metal or gel, the slab is preferably sealed to the heat sink such as by using, for example, but not as a sealing limitation, an elastomeric insulating adhesive gasket. The gasket is preferably thermally insulating and, in some embodiments of the invention, is made from a cured adhesive.

In another embodiment of the invention, the mounting of a slab firmly while also allowing expansion/contraction is accomplished by bonding the slab to a flexible membrane, e.g., a thin metal foil, on one side. This would preferably be soldered if the membrane were a metal foil. The other side of the foil is in contact with a high thermal conductivity medium, preferably a liquid metal or a thermally conductive gel or slurry. In both of the preceding embodiments, the liquid or gel fills a reservoir in the heat sink, which is preferably outfitted with bellows to permit the volume of the reservoir to change as the slab deforms due to the thermal gradient present and as the thermally conductive medium expands or contracts. This arrangement has been demonstrated to permit stress-free mounting of slabs and is compatible with multiple heat removal mechanisms including liquid flow channels or mechanical coupling to radiators or heat pipes.

In one preferred embodiment, the liquid or gel is confined to a thin layer between the optic (or other object to be mounted) and the heat sink to promote substantially one-dimensional conductive heat flow through the liquid. In an alternative embodiment, this thin layer is made thicker to permit convective flow, as well as conduction, in order to increase the thermal conduction rate.

In addition to providing the functions of stress-free mounting and high thermal conductance, the presence of the liquid layer as provided by the mounting methods of the invention has other benefits. One such benefit is damping of mechanically introduced acoustic noise. The invention is highly suited to fabricating operating slab lasers and amplifiers and is also suited to a range of other applications including, but not limited to, stress-free mounting and cooling of thin-disk lasers or optics that experience heating due to partial absorption of incident laser light. Bidirectional heat flow through a liquid metal interface is also suitable in applications where optical elements must be temperature controlled, such as, for example, optical parametric oscillator/amplifier or laser waveguide crystals.

More particularly, an optic assembly is provided that has enhanced heat removal. The assembly includes an optic with a heat transfer surface (such as one or more of the sides of a slab) and a heat sink that is configured for conductive heat transfer. The heat sink is positioned in the assembly with an upper surface adjacent to the heat transfer surface of the optic. The upper surface of the heat sink includes a recessed surface that defines a reservoir or internal (but open) cavity, and the assembly further includes a volume of compliant or non-rigid heat transfer material, e.g., liquid metal or gel, provided to fill the reservoir. In some embodiments, the reservoir is sized to have a depth (measured from the upper surface) to provide a thickness of the compliant heat transfer material of less than about 0.005 inches. In some cases, a liquid-resistant sheet (e.g., a metallic foil or elastomeric material) is provided in the assembly and is interposed between the upper surface of the heat sink (or bonded to this surface about the periphery of the recessed portion or reservoir) and the heat transfer surface of the optic, whereby the heat transfer material is sealed into the reservoir. In other cases, the heat transfer material directly contacts or wets to the optic, which may have a layer of reflective material or other coating applied to form all or a part of the heat transfer surface.

Further, a method is provided for mounting an optic to a heat sink to form an optic assembly with improved heat transfer. The method includes providing a metallic heat sink assembly with an upper surface with a recessed portion having a predefined volume. An optic is then mounted onto the heat sink assembly such that at least one surface of the optic is positioned adjacent or proximate to the recessed portion of the upper surface of the heat sink assembly. The method continues with filling the recessed portion of the heat sink assembly with liquid metal or thermally conductive gel such that the liquid metal or gel contacts the surface of the optic that was positioned adjacent or proximate to the heat sink assembly. This may be a direct contact (e.g., with the metal or gel wetting to the surface) or may be indirect, with the method further including attaching a metallic foil to the upper surface of the heat sink assembly about the periphery of the recessed surface to provide a seal.

BRIEF DESCRIPTION OF THE DRAWINGS

FIGS. 4A and 4B show a 3-dimensional or perspective, exploded view and cross-sectional view of a liquid metal mount according to the present invention, using an elastomeric "gasket."

FIGS. 5A and 5B show an alternative construction or embodiment of a liquid metal mount according to the present invention, using a flexible membrane.

FIGS. 6A and 6B show a 3-dimensional or perspective view of a liquid metal mount formed according to the alternative construction shown in FIGS. 5A and 5B.

DETAILED DESCRIPTION OF THE PREFERRED EMBODIMENTS

Figure 1A:
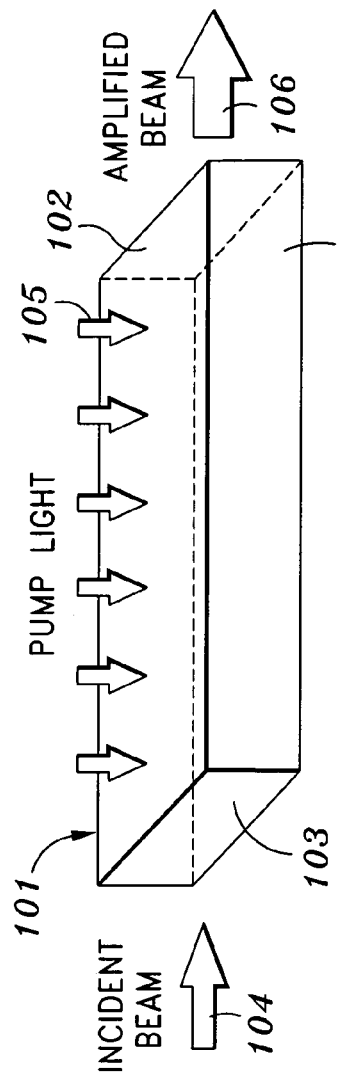
FIGS. 1A to 1D show a slab under varying conditions of thermal loading and mounting.

FIG. 1A illustrates a rectangular optical amplifier slab 101 having a top surface 102 through which pump light 105 enters the material and is absorbed. The slab 101 may be formed of a host crystal doped with an ion, such as, for example, ytterbium doped yttrium aluminum garnet (Yb:YAG) or other similar material such as materials useful for slabs in solid state lasers, including crystalline materials, glasses, and ceramics. Left end surface 103 acts as the signal input surface where an incident beam 104 enters the amplifying material, traverses the slab 101, and exits as amplified beam 106 through the other end surface. When the slab 101 is pumped in this manner, side surfaces (e.g., surface 107) do not play a vital part in the operation of the slab 101. As pump light 105 is absorbed in the slab 101, a fraction of the optical power is converted to heat that preferably is removed. For single-sided pumping, this is typically done through conduction through the bottom surface opposite the top surface 102. A problem that arises during fabricating a slab-based optic assembly or during mounting methods is how to mechanically mount the slab 101 within such an assembly in a manner that heat is efficiently removed while at the same time the slab 101 is maintained in a stress-free or relatively stress free state.

Figure 1B:
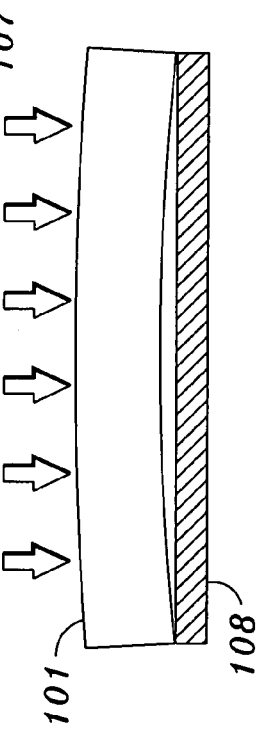
Figure 1C:
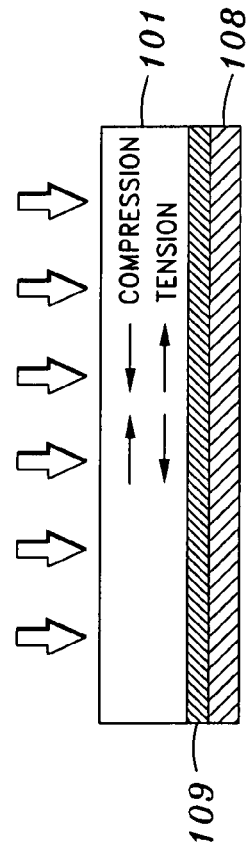

If the slab 101 were initially resting on a conducting heat sink 108 and heat was being removed through the bottom surface, the slab 101 would tend to deform as illustrated in highly exaggerated form in FIG. 1B. This results from differing expansion in the slab 101 as the top portion of the slab 101 has a higher temperature than the bottom of the slab 101 adjacent the heat sink 108. For a number of applications, this deformed state is actually desired because permitting the slab 101 to bow minimizes the internal stresses. However, in other conventional mountings of a slab 101, techniques such as that illustrated in FIG. 1C are frequently used. In this arrangement, the slab 101 is essentially forced to sit flat against the heat sink 108 through the use of a bonding layer 109 that bonds the slab 101 to the heat sink 108. One problem with this method is that by forcing the slab 101 to be flat the top part of the slab 101 is internally in compression while the bottom part of the slab 101 near the bonding layer 109 is in tension. The resulting stress gradients can easily be large enough to cause stress-optic effects that severely distort the quality of the laser beam undergoing amplification in the slab 101. As one skilled in the art may note, one way to mount the slab would be to create heat sink 108 such that its interface surface is fabricated in the operationally deformed shape of the slab, but the stresses would then be present in the non-operational state, which is again generally undesirable.

Figure 1D:
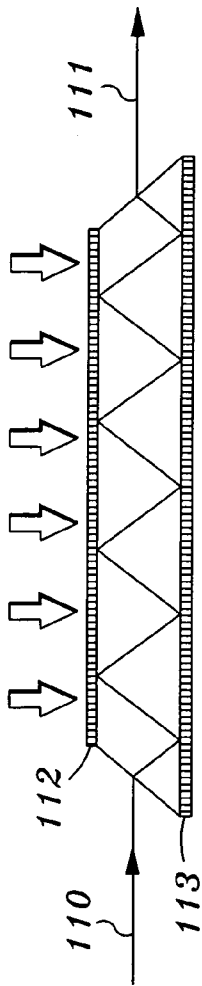

For the sake of completeness, it is also noted that slabs are frequently not constructed with perpendicular end faces, as shown, where the incident beam 104 makes a straight pass through the slab 101 as indicated in FIG. 1A. More commonly, the construction is as illustrated in FIG. 1D. Here, the end faces are cut at an angle such that an incident beam 110 refracts at the input face and traverses the slab in a zig-zag fashion as a result of total internal reflection before exiting the slab as beam 111. In the following discussion, slabs are illustrated with a rectangular construction (or cross section), but it is stressed that this is for illustrative purposes only with "rectangular" slabs often having the form shown in FIG. 1D. The manner in which optical beams are propagated through the material is not essential to operation of the invention. Similarly, the side faces need not be perpendicular for this invention to apply.

Additionally, as shown in FIG. 1D, coatings may be applied to the top and bottom surfaces of slabs. The top coating 112 is generally an anti-reflection dielectric coating designed to minimize the reflective loss for pump light entering the slab. The bottom coating 113 is generally designed to be reflective at the pump wavelength such that pump light that is not absorbed in one pass through the slab is further absorbed in a second pass following reflection from coating 113. The top coating 112 is not essential to the present invention and will not be discussed further (although it may, of course, be utilized in laser assemblies or devices formed according to the present invention). In contrast, the bottom coating 113 is one useful feature of the invention, and how it is included and utilized in laser assemblies will be discussed further below.

One parameter of interest in building high quality amplifiers is the transmitted wavefront, i.e., the degree to which an optically flat wavefront is distorted in propagation through the slab, such as in the slab between or from 110 to 111 as shown in FIG. 1D. Spatially uneven cooling or stresses imparted to the slab from the mechanical mounting leads directly to such distortions. Extensive testing of mounting techniques by the inventors have shown that bonded interfaces, such as the one illustrated in FIG. 1C, generally yield unsatisfactory results (i.e., uneven and/or poor cooling) and present a great limitation on optical performance of slabs under high heat loads. For example, thermally conductive silicone, exemplified by NuSil CV-2946 from NuSil Corporation, provides a good heat conduction path (e.g., when provided as a layer of material contacting the slab such as bonding layer 109 in FIG. 1C, but the post-curing stiffness of the material still imparts sufficient stresses in slabs to degrade performance when heat loads are applied. Similar or worse results have been obtained with a variety of materials that include epoxies, RTV-type adhesives, thermal greases, and thermal greases filled with diamond particles and copper meshes.

To address these disappointing results obtained with conventional materials, the current invention uses liquid metal to provide stress-free mounting and a heat transfer or cooling path with high thermal conductivity for efficient heat removal. The general idea is that a liquid provides an excellent interface to a solid without producing local pressure variations. Preferably, mounting techniques (and assemblies produced by such methods) are adapted to allow the liquid to expand and contract. As a result, the interface is also highly compliant in the sense that it permits the heat source dimensions to vary without increasing the internal stresses. This is in contrast to the electronic chip applications discussed in the background in which the heat source dimensions vary little but the liquid interface is compliant against relative movement between a heat sink and the chip. Further, liquid metals have very high thermal conductivity and are consequently very efficient at transferring heat. Materials like thermal greases and silicone have typical thermal conductivities less than approximately 4 W/m° K whereas liquid metals employed in the invention can have thermal conductivities >15 W/m° K, which represents a considerable improvement in heat transfer capabilities. As the field of materials science introduces higher conductive gels or slurries in the future, these materials would likely be acceptable for use with this invention as well, and the invention is not limited to presently available materials.

Figures 2A, 2B:
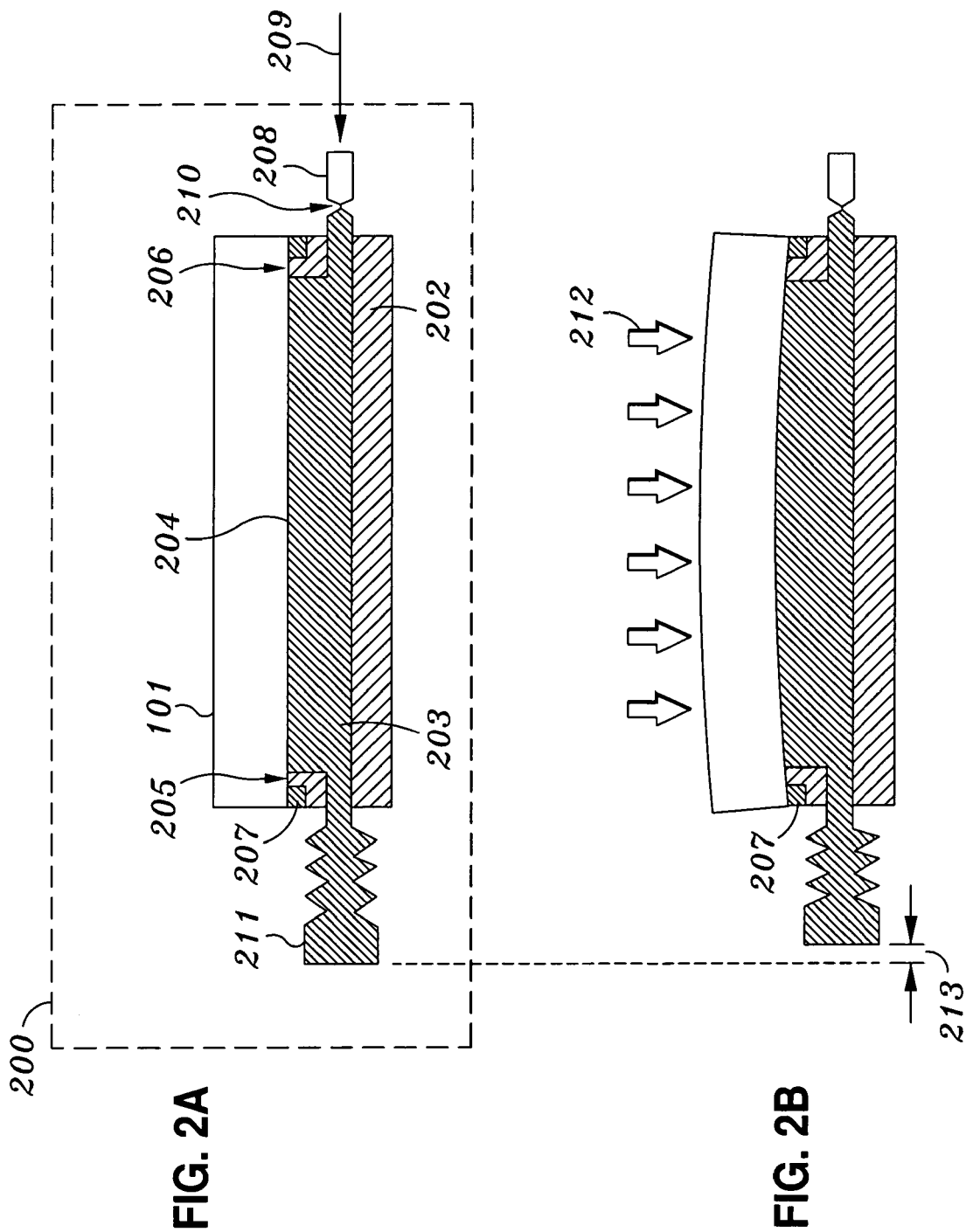
FIGS. 2A and 2B show cross-sectional views of a liquid metal mount or mount assembly according to the present invention, using an elastomeric "gasket."

FIG. 2A shows a cross-sectional view of one embodiment or laser assembly (or mount) of the invention, and as shown, liquid metal is provided in direct contact with the slab of the assembly. The slab 101 preferably has a bottom coating (not shown due to its relative thinness). The slab 101 rests on a heat sink 202 with the bottom coating contacting or being adjacent to the heat sink. Small areas 205 and 206 (e.g., "mechanical reference contacts") provided in opposite ends or edges of the heat sink 202 near the ends of the slab 101 are in contact with the slab 101 to provide a mechanical reference. A portion (e.g., a "liquid reservoir") of the heat sink 202 is hollowed out and filled with a liquid metal 203. This filling is done, for example, by providing an access port 208 where the liquid can be injected as shown by arrow 209. The hollowed out portion or liquid reservoir of the heat sink 202 is substantially completely filled with liquid metal after which the filling port 208 is sealed off. This may be done in a number of different ways. One example is to use a thin walled tube as the filling port 208 and crimping the tube as illustrated at point 210. In a preferred embodiment, an expansion reservoir is also provided to allow the volume of the liquid metal 203 to change. This may be achieved, as an example, with bellows 211, which are also filled with the liquid metal 203. Another element of the complete unit (mount or laser assembly) 200 is a seal or "gasket" 207 provided on a recessed surface of the heat sink 202, created for example using an elastomeric thermally insulating adhesive, which reduces the risk of the liquid metal 203 escaping the assembly 200.

FIG. 2B shows the assembly in operation under a thermal load. In operation, pump light 212 enters the slab as discussed above and differentially heats it. As the slab distorts, the center portion of the slab moves in the upwards direction (e.g., attempting to create a somewhat arcuate cross section). This movement slightly increases the volume of the liquid filled cavity in the heat sink. The required extra volume is drawn from the reservoir or bellows 211, which consequently contracts as indicated at 213. It is also clear that if the liquid metal is heated such that its expansion is greater than the volume increase due to slab deformation, the bellows would expand rather than contract. As can be seen, the assembly 200 operates so as to permit the slab 101 to: a) be mechanically registered to the heat sink 202; b) deform without creating stresses (or, at least, with reduced stresses being created) in the slab material; and c) conduct heat very efficiently to the heat sink 202.

Figure 3A:
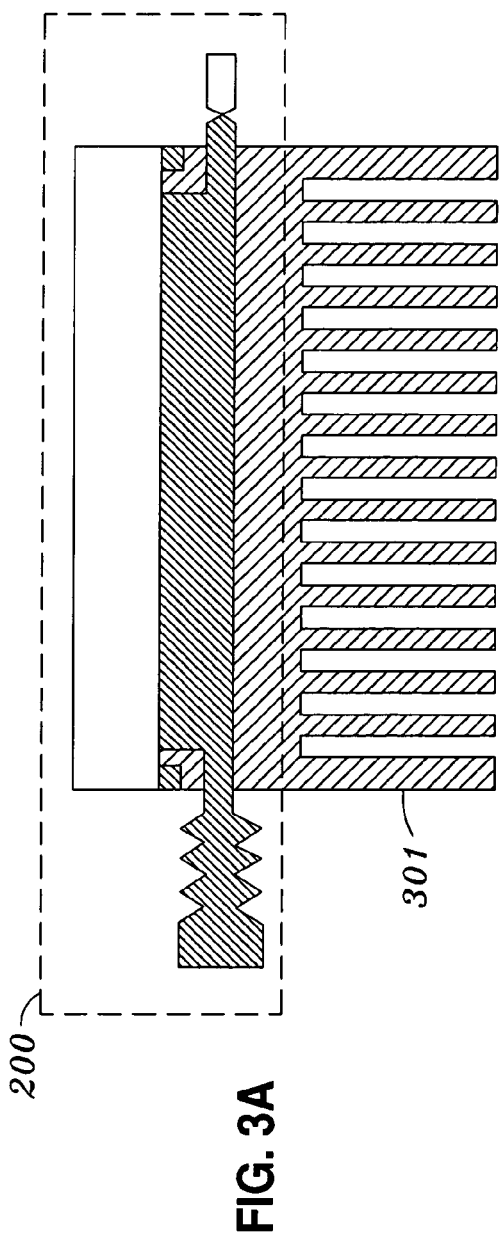
FIGS. 3A and 3B show the liquid metal mount, such as the mount or assembly of FIGS. 2A and 2B, further incorporating heat exchangers.
Figure 3B:
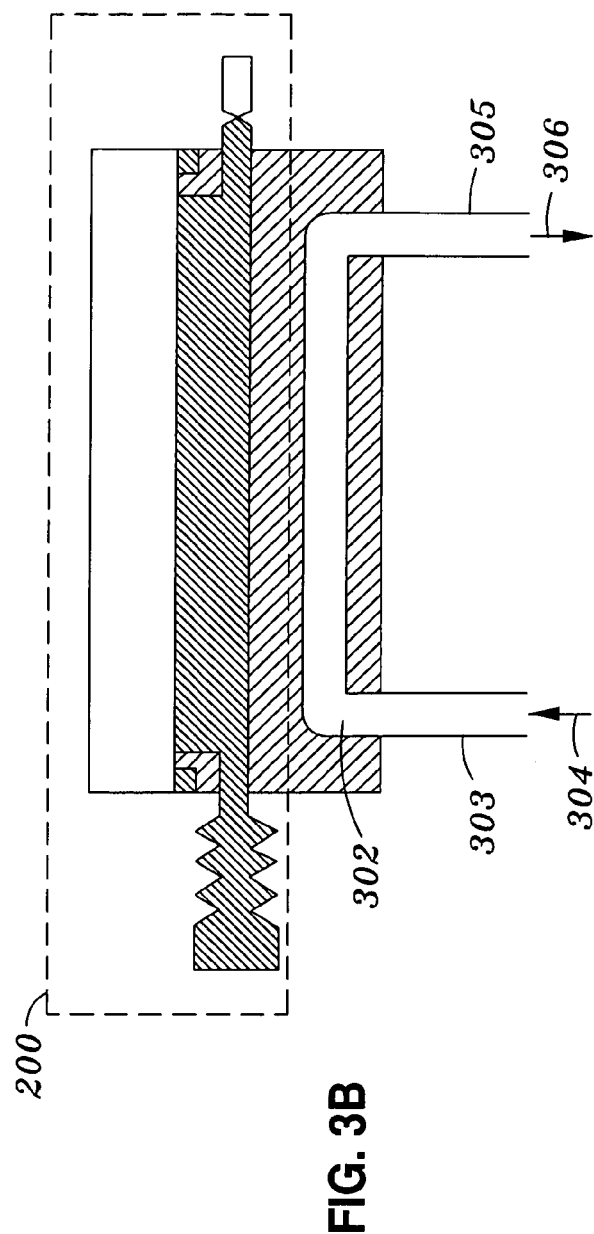

Uniform heat conduction and stress free mounting are two desired operating conditions of slab amplifiers or slab laser assemblies. A third desired operating condition or parameter is the effective removal of heat through the use of a heat exchange or transfer mechanism, which may be provided as an additional component or feature of assemblies of the invention and may be accomplished in numerous ways. Two examples of heat exchange or transfer mechanisms are illustrated in FIGS. 3A and 3B. In FIG. 3A, the assembly 200 is connected (e.g., heat sink 202 or the like) to a passive radiator having cooling fins 301. In the alternative embodiment shown in FIG. 3B, the heat sink of assembly 200 contains one or more internal channel 302 having an input port 303 and an output port 305 such that a cooling medium, for example water, can be pumped through the channel from 304 to 306 and carry heat away from the heat sink. In some cases, the heat exchanger element or feature does not need to be a permanent part of the heat sink assembly but may be attached for easy removal and mounting in any number of conventional ways, such as bolted on with an interface having a high heat transfer coefficient.

The inventors have fabricated an assembly 400 (with components similar to that as described for the assembly of FIGS. 2A and 2B), which is illustrated in an exploded view in FIG. 4A. The fabricated assembly 400 comprises five primary parts: the slab 101 as has been described above, an injection-molded elastomeric seal 410, a "picture frame" element 420, a cold plate 430, and a heat exchanger 440 (e.g., in this assembly 400, a heat sink can be thought of as being provided by the elements 410, 420, 430, and 440). The seal 410 has several features. The seal 410 is preferably, but not necessarily, formed in-place using tooling and includes a thermally insulating elastomeric adhesive that, when cured, acts to both seal and hold the slab 101 in place in the picture frame element 420. When the assembly 400 is assembled, the slab 101 seats into the seal 410, which in turn seats in recess 421 in the picture frame 420. This forms a picture frame subassembly indicated by bracket 470. In this assembled state, the slab 101 is registered against picture frame features (e.g., end walls or slab registration members) 404 and 405. Side ribs 401 of the seal 410 seals the sides of slab 101 against the elongate sides of the recess 421, and end ribs 402 and 403 seal the ends of the slab 101 against the picture frame 420. An advantage of making this subassembly 470 made up of the slab 101, the seal 410, and the picture frame 420 is that the subassembly 470 can be removed from the rest of the assembly 400, for example to examine or clean the underside of the slab 101, without having to break the elastomeric seal 410.

Cold plate 430 generally includes a flat part that seats against the underside of picture frame 420. The cold plate 430 may have a protrusion 408 that fits into the underside of recess 421 in the picture frame 420 leaving a small gap between the protrusion 408, the picture frame 420, and the slab 101 (or a heat transfer surface of the slab 101 positioned proximate or adjacent to the picture frame element 420) to be filled with liquid metal or gel (not shown). While the protrusion 408 is not necessary for functioning of the invention, it is sometimes convenient to have in an assembly 400. For example, by altering the height of the protrusion 408, the thickness of the liquid metal layer may be easily altered. Holes 406 and 407 are provided in order to allow the assembly to be filled with liquid metal (i.e., are inlets/outlets for a reservoir formed in the heat sink of assembly 400). The holes 406 and 407 may be sealable or preferably, are connected to an expansion reservoir as discussed above with these additional components are not shown for clarity. During assembly, the picture frame subassembly 470 is mated to cold plate 430 in order to form cold plate assembly 480. Generally, there is an o-ring gland cut into the cold plate 430 indicated generally by dashed outline 409, so that the picture frame 420 and the cold plate 430 may be sealed against leaks of the liquid metal. Screws and other hardware (not shown) may also be included to mate the two parts.

The complete assembly process for the full assembly 400 includes attaching the cold plate assembly 480 to a heat exchanger 440 that removes heat that is transferred from the slab 101 to the cold plate 430. In cases where water cooling is used, the heat exchanger has a water inlet 413 and a water outlet 414 and an internal flow channel 415, such that water can flow from direction 411 into the flow channel, and out in direction 412. The heat exchanger 440 also generally has a machine o-ring gland indicated generally by dashed outline 416. Screws and other hardware (not shown) may be used to mate the cold plate subassembly to the heat exchanger 440.

The fully assembled assembly 400 as described is further illustrated by a functional (not to scale) cross-sectional drawing in FIG. 4B. In FIG. 4B it can be seen that slab 101 seats against the picture frame 420 via seal 410. Cold plate 430 seats against the bottom of picture frame 420 leaving a small gap that is filled with the liquid metal or gel 450. The cold plate 430 in turn seats against heat exchanger 440 leaving an internal space which gets filled with flowing water 460. Approximate locations of o-rings to seal the subassemblies as discussed above, are also indicated by exemplary black dots, such as o-ring 417.

The mounting techniques described with respect to FIGS. 2A to 4B have several advantages as discussed above. In particular, the assemblies provide for a highly compliant interface directly to the liquid metal and consequently, substantially no stresses are transmitted to the slab from the "bonding layer" or heat sink. From this description, it should be apparent that it is desirable in the construction of the assembly to provide an effective method or way to mount the slab and to also seal it but often the exact manner in which these are achieved is not limiting of the invention. The in-place formed gasket is convenient and has been demonstrated to work well but other methods to accomplish the same sealing result will likely be evident to those skilled in the art after reading this description and are considered within the breadth of this disclosure.

FIGS. 5A to 6B illustrate a variation on the disclosed mounting technique that uses a flexible membrane (such as for example a thin metal foil) through which heat flows to the liquid metal or other highly conductive liquid, gel, or slurry and that is also compatible with harsh environments. The general construction is very similar to the already described technique, with at least one significant difference. Rather than contacting the liquid metal directly to the slab, the heat sink assembly 501 (see FIGS. 5A and 5B) is fabricated as a sealed unit using a thin membrane that also acts to transfer heat from the slab to the liquid metal.

A cross-sectional view of such an assembly 500 is shown in FIG. 5A. The assembly 500 has a number of elements in common with FIGS. 2A and 2B, and these will not be described in detail again. These include the heat sink 502 and the liquid metal 503 in a liquid reservoir of heat sink 502. In the assembly 500, a thin membrane 504, such as a 0.001 inch thick sheet of a metal such as nickel or the like, is stretched across the heat sink frame and welded (illustrated as bead 505) or otherwise sealably attached to the heat sink 502. In this manner, a completely sealed unit 501 is formed having an internal cavity or reservoir that is filled with liquid metal 503, where the thin foil membrane 504 will still allow the slab 101 to deform under the heat load.

Optical operation and attachment of the slab 101 is achieved with a multi-layer structure as illustrated by layers 506-508 in FIG. 5A. For clarity in illustration, the layers 506-508 are shown with highly exaggerated thicknesses. Layer 506 is generally a highly reflective coating, such as a reflective at the pump wavelength, and serves to confine light to the interior of the slab 101. Coating 507 is one or more coatings that protect layer 506 as well as acting to provide a solderable surface (when required). Layer 508 is a low melting point and relatively ductile solder and may have a thickness of approximately 0.002" (0.05 mm) or the like. The thickness determination is driven by two principal factors. On one hand, it is desirable to have as thin a layer as possible to minimize heat transfer resistance while on the other hand, it is desirable to use a thick enough layer that internal solder stresses can be "relaxed out." As an example, indium-based solders used in thicknesses of approximately 0.002-0.005 inches meet these specifications or factors. Lines 509 indicate that the slab 101 may be located such that solid metal support is present under the slab 101. It is also noted that the slab 101 may be of substantially the same length as the heat sink assembly 502 or the ends of the slab 101 may protrude as illustrated in FIG. 5A. In such cases, it is generally desired that the pumped region of the slab 101 does not extend very far past the unsupported portions of the slab 101. However, it may be desired in some applications to have the supports 509 located at the neutral points of the slab 101 such that the deformation at the ends would go down while the center portion goes up (or vice versa). This configuration would be covered by the present invention as well as any modifications thereof. The disclosed method is not limited to slabs consisting of a single piece of laser active material. On the contrary it is compatible with hybrid structures as well, such as slabs that consist of a laser active portion and undoped endcaps attached to the ends of slab 101. Such constructions are well known in the art and are in some cases used to ensure that heat deposition and consequent surface deformation is minimized at surfaces where the laser beam enters and exits the amplifying medium.

Heat removal from the heat sink 502 may be carried out in a number of ways, including the use of fins or cooling channels as previously discussed with reference to FIGS. 3A and 3B. Alternatively, multiple cooling channels 514 may be provided within the heat sink 502 as shown. These may also constitute heat pipes. Alternatively, as illustrated in FIG. 5B, the foil 504 can be mounted to a frame or first heat sink 502 with an opening into which a separate or second heat sink 515 can be inserted. This would enable the heat sink 515 to be made such that it could be removed, which, in turn, would allow the same slab mount design to be used for different methods of heat removal (i.e. liquid, heat pipe, or convective cooling) by use of differing heat sink assembly 515 designs. ill cases where such a removable heat sink 515 is used, it is generally necessary to seal the insert 515 to the frame 502 to prevent leakage of liquid metal. This may be accomplished for example through the use of o-rings as illustrated by 520.

FIGS. 6A and 6B illustrate the construction of a suitable or exemplary sealed assembly 600 according to the invention. FIG. 6A illustrates an exploded view showing the main elements: a slab 601, a solder layer 602, a membrane 603 that is stretched over a heat sink 604, and an internal cavity or reservoir 605 for containing liquid metal (not shown). The width of the foil membrane 603 is such that any edge effects from the welded or other seal will not have an appreciable effect on the deformed shape of the slab 601. Not shown in FIGS. 6A and 6B are the filling port and the bellows, which would also typically be incorporated into the design of assembly 600. FIG. 6B shows the assembled state of assembly 600 and also illustrates with line 606 the typical location of a welding seam that seals the membrane 603 against the heat sink or frame 604. In a prototype assembly similar to the illustrated assembly 600 fabricated by the inventors, the weld was produced using electron-beam welding after stretching a nickel foil across the heat sink in a jig built for that purpose.

Materials Selection

Selecting proper materials for use in the invention is important to adequate operation. One of the more important materials is the compliant heat transfer medium (e.g., liquid metal 203 of FIG. 2A). Several liquid metals are available that can advantageously be used. Mercury (Hg) has excellent thermal and mechanical properties but has the disadvantages of generally being considered unsafe. NaK has a desirably low melting point of $-12°$ C. but reacts strongly with air and water and therefore, also has some undesirable properties. Gallium (Ga) is liquid at room temperature and this property is frequently used when liquid metals are required. However, the 29.8° C. the melting point is sometimes too high to be useful in laser applications. Pure Ga is also highly corrosive and/or absorptive on most metals, including aluminum (Al), which is frequently used to fabricate lightweight heat sinks and other mechanical mounts. However, this material can advantageously be used if contact surfaces are first appropriately coated to prevent corrosion. This may be done with, for example, a nickel, platinum, or chromium coating.

In some embodiments, the heat transfer materials employed are alloys of Ga. In particular, the material known as Galinstan (available from Geratherm Medical AG, Germany), which is an alloy of gallium, indium (In), and tin (Sn), is used and has excellent thermal and mechanical properties and is less corrosive than pure gallium. The low toxicity in comparison with mercury and low melting point (−20° C.) of this gallium alloy makes it easy to handle and highly suitable for laser applications. It should be noted that, if a Ga alloy is used, the side of the foil and heat sink/frame can be plated with, for example, gold to aid wetting of the Ga alloy to the foil and heat sink/frame. Another suitable material that has been used by the inventors is Indalloy 46L.

The above discussion has specifically stated liquid metal as the compliant thermally conductive medium. However, it is noted that what is important is not the specific material, but rather the physical properties of the material in maintaining a good thermal interface without requiring pressure between surfaces. The term "liquid metal" should therefore be interpreted as any material that meets desired operating parameters of compliance and thermal conductivity. The compliance parameter can also be met with: fluids of low to high viscosity; non-Newtonian visco-elastic fluids; flowing or thixotropic gels; or materials that are similar in nature. The main properties of concern are that the material remain compliant and continuous and present low thermal impedance (for example, ensuring that the material wets the surfaces) over the operating temperature regime while the heated surface distorts. The thermal conductivity parameter is generally met by materials having a thermal conductivity in excess of approximately 5 to 10 W/m° K. It is further noted that while the liquid metal layer can be formed simply by the liquid, it is quite possible, and in certain circumstances highly desirable, to produce hybrid interfaces. One example would be to incorporate a metal mesh, such as one made from copper, into the liquid metal layer. One advantage of this approach is that it may increase wicking, i.e., the liquid is drawn more easily into the layer through the presence of the mesh. The presence of a high thermal conductivity mesh in the reservoir or internal cavity of the heat sink would also increase the effective thermal conductivity of the liquid metal layer and thereby, reduce the temperature rise across the interface.

Alternative Embodiments

The above discussion has indicated a primary use of the disclosed slab assemblies with improved heat transfer as being laser amplifiers. However, it is stressed that this is only an example of a use. The disclosed technique can be used in a wide variety of situations where an object must be mounted in a stress-free manner while providing a high thermal conductivity path for heat removal. In the field of photonics, another exemplary use is mounting of thin disks used for disk lasers. Such lasers are typically constructed from a thin circular disk of laser active material. Typical materials include doped crystals, such as YAG, YLF, or others were known in the art, or doped glasses. Common dopants include rare-earth materials, including Nd, Yb, Er, Tm, Pr, and Ho. Highly doped crystals are preferred as they permit pump light incident on the circular face of the crystal to be absorbed in a short distance. The disk thickness may range from on the order of 1 mm to only several hundred micrometers. Use of very thin disks is desired to minimize temperature rise in the material as the disks are generally cooled from the backside. The thin nature of the disk, in conjunction with a diameter that may be for example 10 mm or much greater, makes mounting critical in order that stresses and deformations are well controlled. In conventional construction, the disk is generally bonded to a heat sink using a thin layer of permanent bonding material.

Figure 7A:
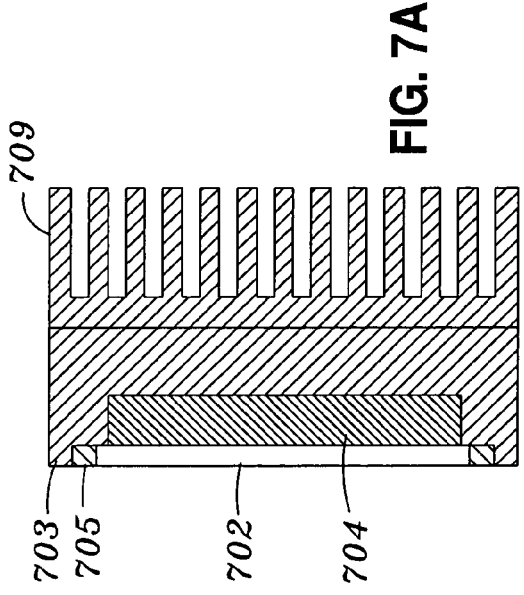
FIGS. 7A to 7C show the construction of a liquid metal mount according to the present invention as applied to a thin-disk laser.
Figure 7B:
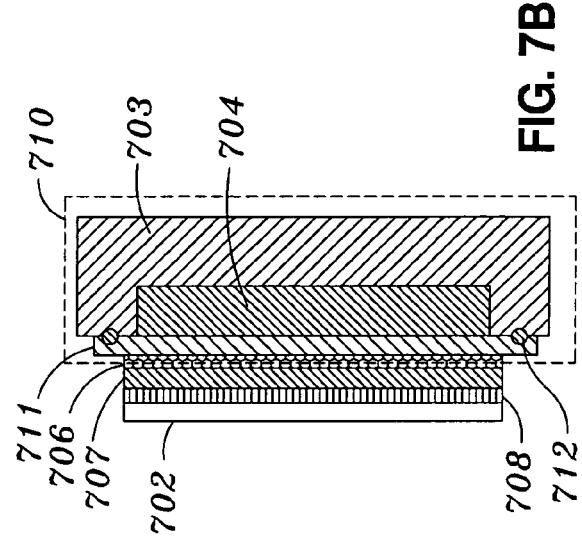
Figure 7C:
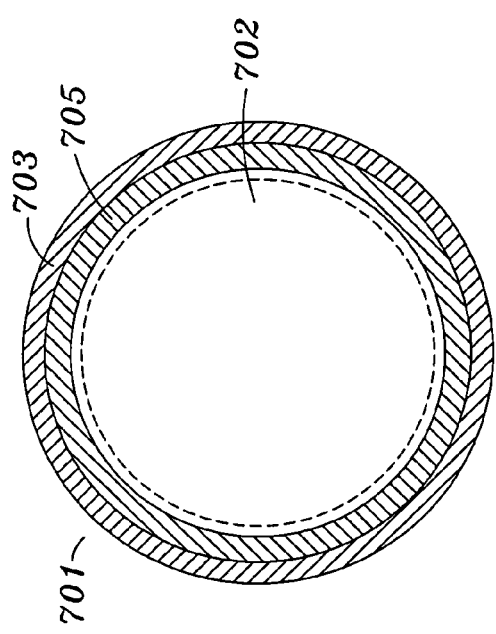

FIGS. 7A to 7C illustrate the use of liquid metal in mounting thin laser disks (e.g., where the "object" to be mounted is a disk rather than a rectangular slab). FIG. 7C is a front view of a typical thin disk laser assembly 701 comprising the laser disk 702 and a gasket 705 to provide a seal between the disk 702 and heat sink 703. FIG. 7A is a cross-sectional view of the assembly 701, wherein is also illustrated a cavity in the heat sink that is filled with liquid metal 704 in contact with the back side of the laser disk 702. The purpose of the liquid metal 704 is again to provide a stress-free interface to the thin disk 702 while efficiently transferring heat to the heat sink 703. The assembly 701 as described may also incorporate heat exchange mechanisms as discussed in conjunction with FIGS. 3A and 3B, and one exemplary arrangement is shown in FIG. 7A by finned radiator 709 that may be attached to heat sink 703 or may be an integral part of the heat sink 703. Filling ports and bellows mechanisms are not explicitly shown in FIGS. 7A to 7C but may use the same construction principles as those discussed above.

It is also possible to bond the disk 702 to a sealed assembly 710 as illustrated in FIG. 7B, where a membrane 711 is attached by, for example, welding 712 the membrane 711 to heat sink 703. The method of bonding the disk 702 to the sealed assembly 710 follows the same principles as those used to discuss FIGS. 5A and 5B including layers 708 and 707 (corresponding to previously discussed layers 506 and 507) and solder layer 706.

In the preceding discussion of the liquid, the layer thickness has not been illustrated to scale and has been shown in FIGS. 5A and 5B as a relatively thick cavity or reservoir in the illustrated heat sinks. The thickness of the liquid layer is generally not critical but should be optimized for the particular application. Too thick a layer may lead to a larger than acceptable temperature rise across the liquid metal layer as the thermal conductivity of the liquid metal is typically substantially less than the thermal conductivity of the heat sink. For example, the thermal conductivity of the liquid metal may be in the range of 8-20 W/m° K, while that of aluminum, as frequently used for heat sinks, is greater than 200 W/m° K. Too thin a layer may impede the flow of the liquid metal (e.g., when filling the heat sink) or may create problems when freezing. It has been found that layer thicknesses in the range of, for example, 0.005 to 0.020 inches work well, although other thicknesses outside this range may also work well for specific applications.

Figure 8A:
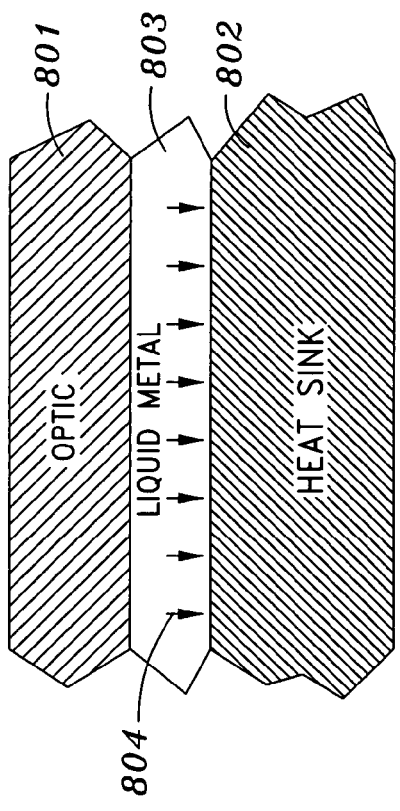
FIGS. 8A and 8B illustrate representative heat flow in thin and thick layers of liquid.
Figure 8B:
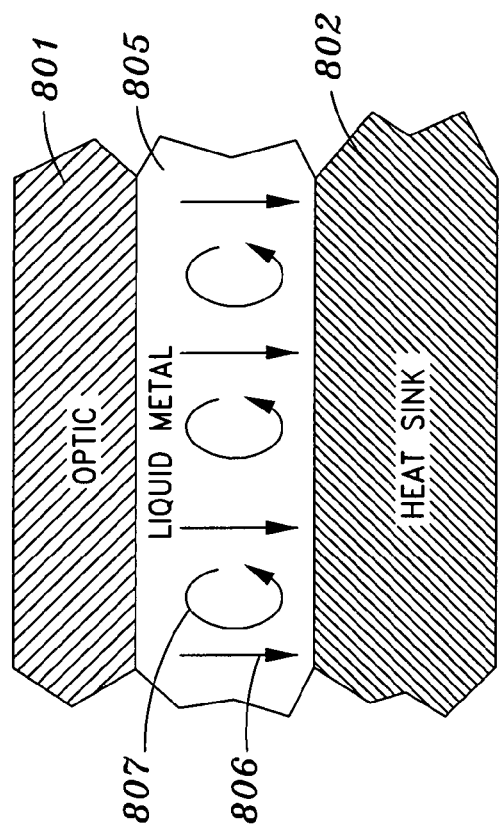

In general the thickness can be designed or selected to promote two types of heat flow, as illustrated in FIGS. 8A and 8B. In FIG. 8A, the interface between an optic 801 (e.g., a slab, disk, or other "object") and a heat sink 802 is illustrated as being filled with a liquid metal layer 803. In the case where the liquid metal layer 803 is thin, for example, having a thickness in the range from less than 0.001" to several thousandths of one inch, the heat transfer is primarily one-dimensionally conductive as illustrated by arrows 804 that indicate the direction of heat flow. FIG. 8B illustrates another useful configuration of the invention in which optic 801 and heat sink 802 are spaced apart by a thicker layer 805 of the liquid metal. With a thicker layer 805, conduction still takes place as indicated by straight arrows 806 but at the same time, convective currents as indicated by arrows 807 may form in the liquid 805. This liquid circulation 807 is sometimes beneficial as it increases the heat transfer rate from optic 801 to heat sink 802. It is noted with reference to FIGS. 8A and 8B that for simplicity only the operating principle is illustrated. Consequently membranes and/or coating layers that would normally be present at the liquid metal/optic interface have been omitted.

The preceding discussion has further assumed that the desired heat transfer is from an optic or mounted object to a heat sink. However, the process is entirely reversible so that heat can equally well flow from a heat sink or more accurately a heating element to an optic. This may be desirable for example where thermal control of an optic or other stress-sensitive items is required. One example of such a case of practical interest is the temperature control of optical parametric oscillator (OPO) crystals (e.g., these crystals would be the mounted objects in an assembly built according to the invention). When temperature tuning of an OPO is used, it is desired to control the temperature of the crystal using external heaters/coolers. Such crystals are also susceptible to stresses, not only because of thermally induced distortions, but also because some such materials fracture easily. Mounting such a crystal with a highly compliant and thermally conductive interface permits heat to flow both to and from the crystal in an efficient manner. In such cases, the heat sink discussed above should be interpreted as a heat conduction interface that thermally connects the optic to a heater/cooler that may include for example thermo-electric coolers capable of bi-directional heat transfer.

The above discussion has noted use of an optical amplifier. It is understood that the invention is not limited to one-pass or multiple-pass amplifiers, but that the term incorporates more general use, such as the use of an amplifying medium contained within a laser resonator.

It was noted previously that operation of a slab or similar device to a degree involves a choice between letting the slab deform but be stress-free on the one hand or forcing the slab not to deform but to accept stresses. The discussion in this disclosure assumed that in some cases the benefits of deformation outweigh the negative aspects of deformation, and in many cases, this trade-off is even optimal. However, in other situations, it may be that deformations cause an incident laser beam to undergo a change in pointing direction, or translation, or both, as a result of the deformation. In situations where this is a concern, it may be remedied in several ways.

Figure 9:
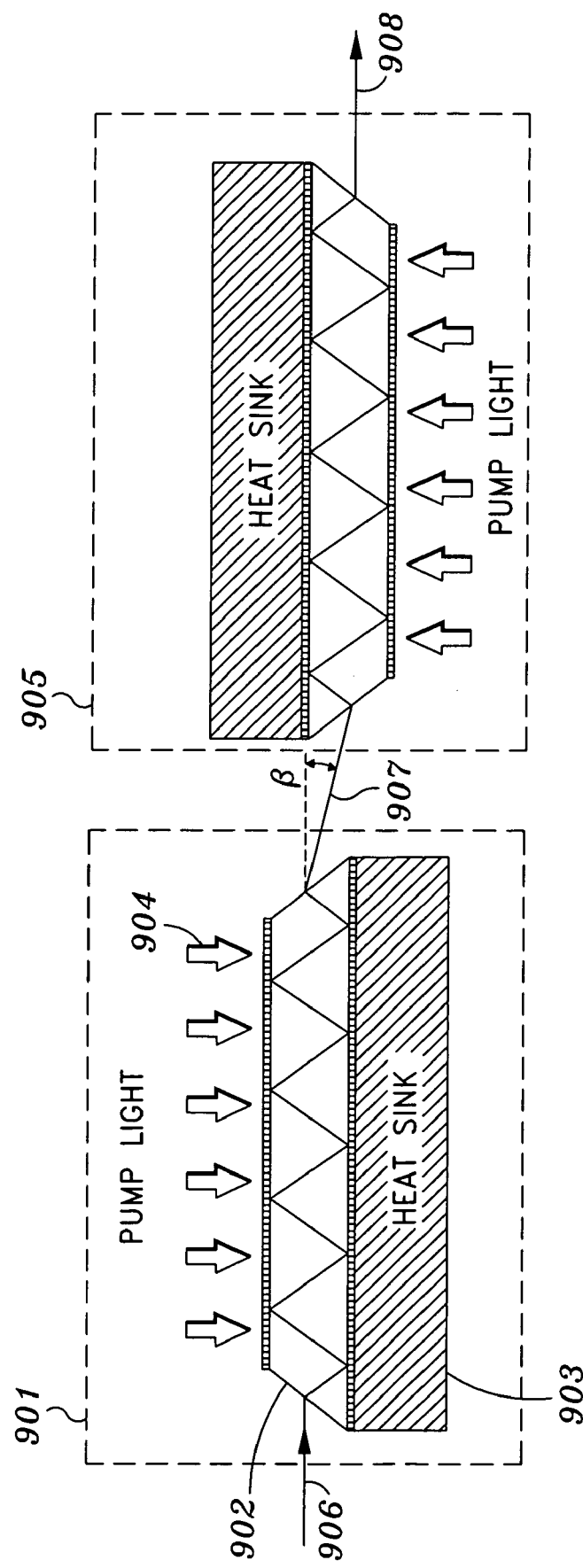
FIG. 9 illustrates a pair of assemblies configured to operate in conjunction according to some embodiments of the invention.

As one example, in a case where the primary effect is mispointing of a laser beam, two assemblies may be operated in opposition such that the mispointing in one slab is compensated by the reverse mispointing in the second assembly. An example of such a configuration is shown in FIG. 9 where a slab assembly 901 that includes generally a slab 902, a liquid metal interfaced heat sink 903, and pump light 904 is followed by a second substantially identical assembly 905 (e.g., the two assemblies 901, 905 are placed adjacent to each other or generally "in-line"). The latter assembly 906 is, however, flipped in the vertical plane as shown. The benefit of this arrangement is that if an incident light beam 906 propagating in the horizontal direction exits the first slab at an angle β to the horizontal, the angular misalignment β is reversed in the second assembly 905. The result is that the output beam 908 emerging from the second assembly 905 is now aligned with the incident beam 906. It is stressed that misalignments β, when they exist to any significant degree, are generally very small but is illustrated in FIG. 9 as large for clarity. It is also noted that the above is meant to describe the type of method useful in remedying a specific issue. In many realistic cases, particularly for slabs operated in zig-zag mode, great care must generally be used in designing both the assemblies themselves and compensation methods as, for example, the number of bounces within a slab may undergo a fractional change, which may not translate into a simple angular deviation of the laser beam.

It is finally noted that the discussion herein has centered around optics where one surface acts as the heat transfer surface. From the disclosure it is, however, clear the technique can be extended to multiple surfaces, including non-flat surfaces. For example, it is possible to end pump a slab and use the disclosed heat transfer technique to remove heat through both top and bottom surfaces using liquid metal heat transfer, e.g., by providing a heat sink assembly on the top as well as the bottom surface (as is shown in the supporting figures). Another specific example of such utility is to use top and bottom cooling of waveguide lasers or amplifiers. These devices have an active region that is generally thin, such as 100 micrometers, sandwiched between upper and lower layers that promote wave guiding of light in the central active region parallel to the active layer. Such devices may be end pumped or side pumped (or in some cases face pumped perpendicular to the guiding layer) and can benefit from top and bottom cooling with a method that does not strain the device. The double-sided cooling approach can then equally well be extended to cool all four sides of the slab while still permitting end-pumping and entry/exit of the laser beams. Further extensions of the approach then also permits round rods and other non-flat surfaces to be mounted and cooled using the disclosed liquid metal technique.

In the preceding discussion, it has been noted that the liquid metal is contained within a closed volume that may vary in magnitude (e.g., amount of liquid metal or gel may vary as well as the shape and depth of the recessed surface receiving the liquid metal). At the same time, some of the embodiments described above are constructed in such a manner that they may allow the slab to move vertically in the presence of differential pressure variations between the liquid and the outside region of the slab. Similar motion may take place in the presence of mechanical vibrations or shocks. Of particular concern is that operation in a low-pressure environment or a vacuum (for example, in space) may cause the slab to not be as rigidly fixed to the mounting frame as desired for particular implementations. Such situations may be remedied in a number of ways, a few examples of embodiments that are useful for better limiting movement of the slab or optical element are shown in FIGS. 10A to 10D.

Figure 10A:
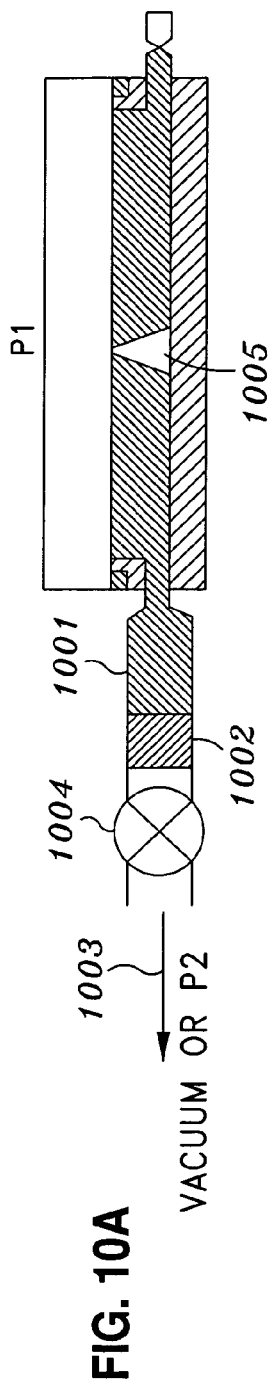
FIGS. 10A to 10D shown another alternative construction or embodiment of a liquid metal mount according to the present invention configured to control vertical movements of a mounted element such as a slab.

In FIG. 10A, the bellows attached to tube 1001 of other illustrated embodiments has been replaced by a piston 1002 that can move to the right or left (or toward and away from the recessed surface/heat sink). By attaching the left end 1003 of the piston tube or cylinder 1001 to a vacuum pump (or a low pressure P2), a pressure difference is created between P2 and the slab surroundings at another pressure P1. The low pressure may be created and maintained more effectively by providing a valve 1004 that may be closed after the vacuum or low pressure has been applied. The piston 1001, which is normally outfitted with piston rings or other seals (not shown) to prevent liquid from escaping past the piston, then pulls on the liquid which creates a positive pressure difference P1−P2 when P1>P2 which pushes the slab against the mount (with elements shown in FIGS. 2A and 2B and other figures not being numbered or described in detail with reference to FIGS. 10A to 10D). In some embodiments, one or more supports 1005 are provided internal to the liquid metal, i.e., within the recessed surface of the mount, in order to control excessive excursions (e.g., bending or other movements) of the slab due to the pressure differential. Such internal stops 1005 are in some cases provided primarily as a safety feature, to prevent slab fracture in the event of an accidental overload in the pressure difference P1–P2. For this reason, it is possible to make the stop or stops flexible or of a flexible or non-rigid material so as not to exert localized pressure on the slab.

Figure 10B:
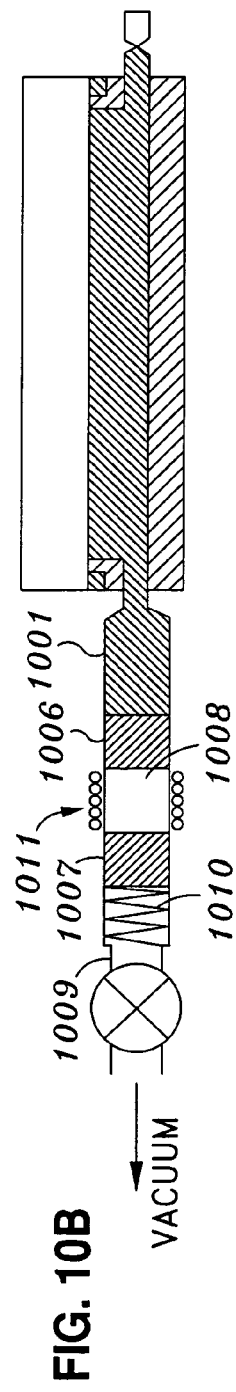

A variation on the embodiment of FIG. 10A is illustrated in FIG. 10B. As shown, two pistons 1006 and 1007 are used to create an internal sealed space 1008 in the piston cylinder or tube 1001 which is filled with a gas. The left or outer piston 1007 may also work against a spring or elastic member 1010 whose motion is constrained by a neck-down 1009 (or other stop element) in the tube 1001. If a vacuum or low pressure is created to exert a force on the piston 1007, the pressure internal to the liquid metal in the mount may be varied by attaching a heating (or cooling) element 1011, which can be used to control the temperature of the gas in sealed space or volume 1008. Since the gas pressure is dependent on temperature, this provides a way to tune the pressure difference between the liquid metal and P1 (e.g., pressure in surrounding environment or external to the mount and slab). It is also noted that incorporation of a controllable pressure differential by the indicated method, or other methods with the shown or other components, also enables one to tune the curvature of the mounted optic or slab while retaining the advantages of uniform pressure and high thermal conductivity.

Figure 10C:
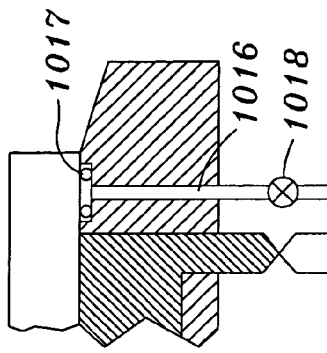
Figure 10D:
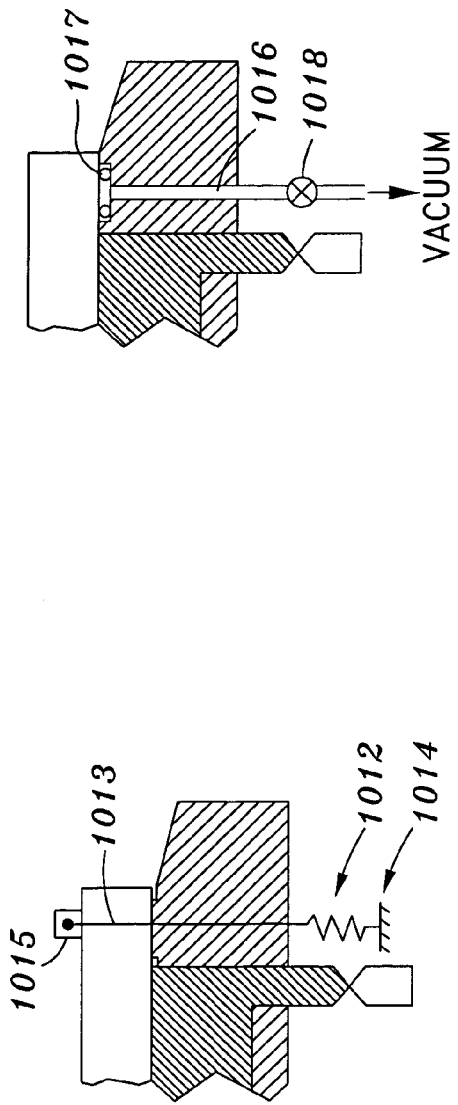

Other ways of applying a positive pressure on the slab to control vertical movement (i.e., movement toward and away from the mount or heat sink) are shown in FIGS. 10C and 10D. FIG. 10C illustrates in a partial view of a liquid metal mount assembly the use of a strap 1013 which is fastened on top of the slab with a fastener or connector 1015 and secured to a fixed position 1014 using a spring or elastic member 1012. FIG. 10D shows yet another liquid metal mount assembly with a channel 1016 cut in the slab mount (or heat sink) and sealed against the slab using an o-ring 1017. The channel 1016 is typically connected to a vacuum or low pressure source and, once the low pressure is established, sealed with valve 1018. This method or assembly also is useful for establishing a pressure differential between the outside (or environment adjacent the slab exterior to the mount assembly) and the low pressure region which then exerts a downward force on the slab.

The embodiments of the liquid metal mount assemblies illustrated in FIGS. 10A to 10D are advantageous for several reasons. The assemblies provide a pressure differential between the exterior of the assemblies and exterior surfaces of the mounted optic, e.g., slab element or the like, and the liquid metal contained in the mount or heat sink. This pressure differential can be selected or controlled statically or dynamically to positively seat the optic against the liquid metal and the mount/heat sink adjacent the liquid metal reservoir (e.g., portions of the heat sink forming the reservoir or recessed surface). The pressure differential at least in some of the embodiments shown in FIGS. 10A to 10B may be generated in a manner that allows the magnitude of the pressure differential to be controlled in a dynamic or periodic fashion, e.g., to lower the pressure at P2 when the external or surrounding pressure P1 decreases and vice versa to maintain a differential setting, which may utilize one or more pressure or differential sensors and a control device (not shown but understood by those skilled in the arts). In some implementations, the differential pressure magnitude is selected so as not only to provide ongoing seating/sealing of the optic against the heat sink and liquid metal but also to control or even select the shape of the mounted optic. For example, a particular pressure differential may be chosen to obtain a desired or predetermined curvature of the mounted optic. In some implementations, the pressure differential is not dynamically adjustable but is instead selected for a particular or anticipated external pressure or range of pressures, such as if the optic if being designed for use in the low pressure environments of space. In these cases, the predetermined curvature of the optic is obtained when the external pressure is within a particular range (e.g., the anticipated external operating pressure for the optic assembly), such as when the assembly is deployed in space or other planned operating environment.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. An optic assembly with enhanced heat removal, comprising:
    an optic having at least one heat transfer surface;
    a heat sink configured for at least conductive heat transfer and positioned with a surface adjacent the heat transfer surface of the optic, wherein the surface of the heat sink comprises a recessed surface defining a reservoir for containing a compliant heat transfer material; and
    a volume of the compliant heat transfer material in the reservoir of the heat sink, wherein the volume is selected to substantially fill the reservoir,
    wherein the compliant heat transfer material is configured to permit deformation of the heat sink while reducing the transmission of stress generated thereby to the optic.

2. The optic assembly of claim 1, wherein the heat transfer surface of the optic contacts the compliant heat transfer material.

3. The optic assembly of claim 1, wherein the optic is attached to the heat sink and the assembly further comprises an elastomeric seal member positioned between the heat transfer surface of the optic and the surface of the heat sink, the seal member extending about the reservoir defined by the recessed surface of the heat sink to form a closed volume substantially impermeable to the compliant heat transfer material and thereby blocking flow of the compliant heat transfer material out of the closed volume.

4. The optic assembly of claim 3, wherein the heat sink comprises a frame element comprising the heat sink surface with a pair of elongate side walls and a pair of end walls defining a hollow channel extending through the frame element, the side walls and end walls being configured for receiving the elastomeric seal member and the optic.

5. The optic assembly of claim 4, wherein the heat sink further comprises a cold plate that mates with a side of the frame element distal to the heat sink surface, the cold plate comprising a protruding element extending at least partially into the hollow channel in the frame element, whereby a volume of the reservoir of the heat sink is further defined by the protruding element.

6. The optic assembly of claim 1, wherein the compliant heat transfer material is a liquid metal.

7. The optic assembly of claim 6, wherein the liquid metal comprises a substantially pure or an alloy form of Hg, NaK, Ga, Galinstan, or Indalloy 46L.

8. The optic assembly of claim 6, further comprising means for setting a pressure of the liquid metal, wherein the liquid metal pressure differs from a pressure applied to the optic exterior to the optic assembly.

9. The optic assembly of claim 8, wherein the means for setting the pressure of the liquid metal comprises means for changing the pressure of the liquid metal to a different pressure to obtain a differential pressure between the different pressure and the exterior-applied pressure.

10. The optic assembly of claim 9, wherein the means for changing the pressure operates to select the different pressure to obtain a predetermined curvature of the optic.

11. The optic assembly of claim 1, wherein the optic comprises a laser slab with a bottom coating, the bottom coating being provided in the heat transfer surface of the optic and contacting the compliant heat transfer material.

12. The optic assembly of claim 11, wherein the optic is configured as a laser amplifier and wherein the assembly further comprises a pump light source positioned such that pump light is incident upon the optic through at least one surface and the assembly further comprises surfaces through which light to be amplified can enter and exit the laser amplifier.

13. The optic assembly of claim 1, further comprising a variable size expansion reservoir containing a variable volume of the compliant heat transfer material, the expansion reservoir being in fluid communication with the heat sink reservoir, whereby the compliant heat transfer material can flow between the two reservoirs.

14. An assembly for providing effective heat transfer away from optical components with reduced internal stress generation, comprising:

an optical object to be mounted in the assembly;

a heat sink with a surface proximate to a surface of the optical object, wherein the surface of the heat sink comprises a recessed surface defining a reservoir containing a volume of non-rigid heat transfer material; and a materially-compatible membrane interposed between the upper surface of the heat sink and the surface of the optical object, wherein the membrane is attached to the upper surface of the heat sink about the periphery of the recessed surface to create a seal blocking flow of the non-rigid heat transfer material out of the reservoir.

15. The assembly of claim 14, wherein the optical object is an optic comprising a solid-state laser material and wherein the non-rigid heat transfer material is a thermally conductive liquid, gel, or slurry.

16. The assembly of claim 14, wherein the non-rigid heat transfer material is a liquid metal selected from the group consisting of pure or alloy forms of Hg, NaK, Ga, Indalloy 46L, and Galinstan.

17. The assembly of claim 14, wherein the non-rigid heat transfer material is a hybrid material comprising a thermally conductive liquid or gel and a mesh or a porous form of a high thermal conductivity solid material.

18. The assembly of claim 14, wherein the non-rigid heat transfer material is a compliant form of a high thermal conductivity solid material.

19. The assembly of claim 14, wherein the optical object is a slab amplifier, a waveguide amplifier, or a laser disk.

20. The assembly of claim 14, wherein the membrane comprises a metallic foil comprising Ni, Pt, or Ti.

21. The assembly of claim 14, wherein the membrane comprises a sheet of elastomeric material.

22. The assembly of claim 14, wherein the optical object comprises a laser slab and the surface of the optical object comprises a layer of coating material proximate to the laser slab and to a bonding layer mating with the membrane to bond the optic to the heat sink.

\* \* \* \* \*